Dec. 11, 1962     E. G. STICH     3,068,155
METHOD OF PRODUCING YEAST
Filed Feb. 27, 1959     2 Sheets-Sheet 1

INVENTOR
Eugen G. Stich
BY
Lowry + Rinehart
ATTYS.

Dec. 11, 1962 E. G. STICH 3,068,155
METHOD OF PRODUCING YEAST
Filed Feb. 27, 1959 2 Sheets-Sheet 2

INVENTOR
Eugen G. Stich
BY
Lowry + Rinehart
ATTYS.

United States Patent Office 3,068,155
Patented Dec. 11, 1962

3,068,155
A METHOD OF PRODUCING YEAST
Eugen Georg Stich, 31 Richard-Wagner-Strasse,
Mannheim, Germany
Filed Feb. 27, 1959, Ser. No. 796,042
7 Claims. (Cl. 195—82)

The invention relates to a process and an apparatus for gassing or for aerating of liquids in which an extraordinary fine distribution of the gas into the liquid is obtained thereby that the gas is passed through ceramic or metallic diaphragms with fine pores of a diameter of 20–60µ.

According to the invention, a partial stream constantly branched from the bulk of the liquid and kept in continuous circulation, preferably in an air-free state, is subjected to aeration by such a diaphragm and then fed again into the bulk of the liquid in the lower part of the main liquid tank.

In this process is obtained by the liquid passing along the diaphragm with a relatively high speed a short breaking away of the gas streams from the wall of the diaphragm. The volume of the gas bubbles discharging in a stationary state is reduced proportional to the speed of the air discharging from the diaphragm and inversely proportional to the speed of the liquid passing along the diaphragm which preferably is a multiple of the discharging speed. This volume is proportional to the third power of the diameter of the bubbles. It is assumed for example that the bubbles discharging in a stationary state from the diaphragm have a diameter of 1 mm. while the air speed is 2 cm./s. In this case would be obtained a diameter of the bubbles of 0.5 mm. at a liquid speed of 16 cm./s. and a diameter of the bubbles of 0.25 mm. at a liquid speed of 128 cm./s. If the total volume of the air is for example 1 m.$^3$, it is obtained with the process according to the invention at an air speed of 2cm./s. and at a liquid speed of 16 cm./s. a total surface of the air bubbles of 12,000 m.$^2$ and at a liquid speed of 128 cm./s. a total surface of 24,000 m.$^2$ while the air bubbles of 1 mm. diameter discharging from the diaphragm in a stationary state would have a total surface of 6000 m.$^2$ only.

In applying this process, not the whole mass of the liquid is passed along the wall of the diaphragm. The liquid passed along the wall of the diaphragm rather serves merely for the production of finest gas bubbles and further as a means for feeding these finest gas bubbles into the main liquid tank, preferably into the lower part thereof from where the fine bubbles are then slowly rising upwards in the main tank.

The partial stream of the liquid which according to the invention is passed through the diaphragm is preferably composed of two components, namely of an automatically circulating portion and of a portion which is pumped by means of a pump through a cooler into an aerator and is then mixed with the automatically circulating portion before entry into the aerator. At a fixed delivery of the pump and with a constant automatically circulating portion, the flowing speed of the partial stream of the liquid along the wall of the diaphragm may be increased by reduction of the flow cross-section between the wall of the aerator and the wall of the diaphragm. The contacting surface between the partial stream of the liquid and the wall of the diaphragm is suitably increased by elongation of the flowing path of the liquid in the aerator.

In the drawings are shown by way of example several embodiments of an apparatus for carrying out the process according to the invention.

Figure 1:
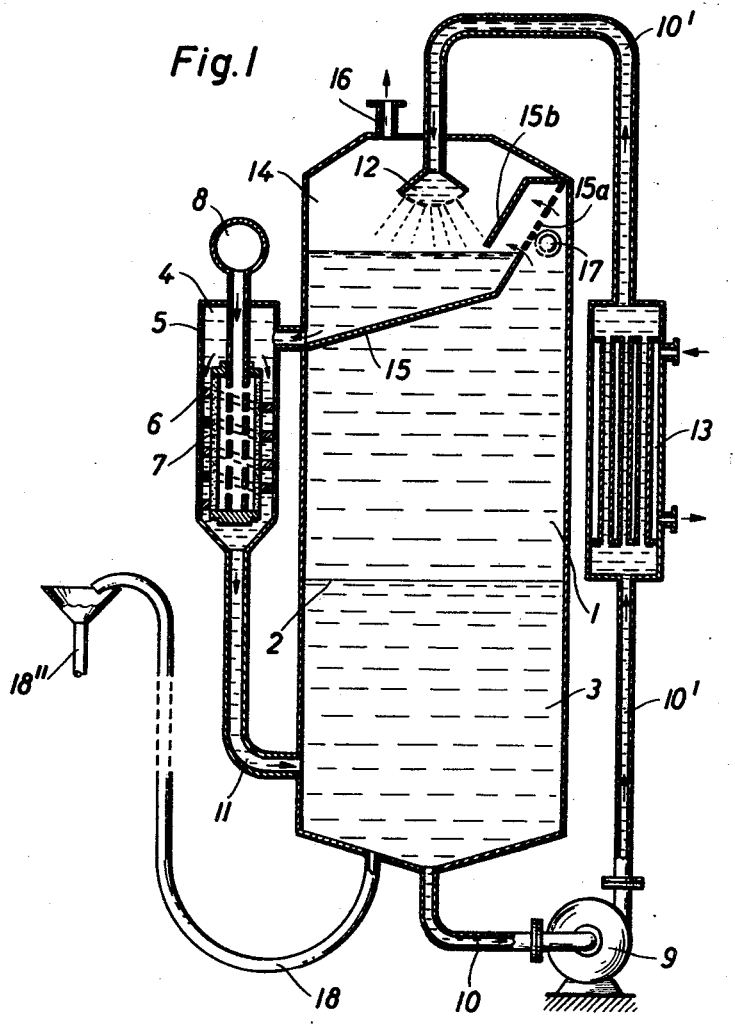
FIG. 1 shows diagrammatically an apparatus for the aeration of yeast-containing mash as it is used in the yeast industry.

According to FIG. 1, a quantity 3 of yeast-containing mash is at rest at the level 2 in a tank 1. Outside of this main liquid tank is arranged the aerator 4 which consists of the outer wall 5 of a cylinder and is provided with inner partition walls 6 which are formed helically. The inner diameter of these walls 6 strictly corresponds to the outer diameter of the diaphragm tube 7. In this manner, the mash is passed helically along the surface of the diaphragm 7 so that by reduction of the flow cross-section the flowing path of the liquid along the diaphragm 7 is greatly enlarged. By means of an inlet 8, the diaphragm 7 is supplied with gas or air which enters then through the pores of the diaphragm into the passing mash.

The wall 5 of the aerator may also be shaped itself like a helix enclosing the diaphragm and contacting the same with those parts of the wall having the smallest diameter.

The aerator 4 is preferably arranged above the level 2 which is obtained if the liquid mash is at rest that means not intermixed with air. Thereby is prevented clogging of the diaphragm tube if the aerator is out of action. This occurs for example during withdrawal of the yeast if the circulation of the partial stream of the liquid is interrupted. In view of the higher position of the aerator 4, the liquid discharges then from the same into the tank 1 so that not only clogging of the diaphragm tube is prevented but the diaphragm is simultaneously dried, especially if its aeration is maintained.

A pump 9 serves for feeding a part of the mash into the aerator 4. The pump 9 is connected by a pipe 10 with the lowermost part of the tank 1. The pipe 11 connecting the tank 1 with the discharge side of the aerator 4 opens somewhat above this lowermost part of the tank that means at the bottom of the tank is air-free mash. This air-free mash is fed through pipe 10 and pipe 10' into a sprinkler 12. In the path of pipe 10' is provided a cooler 13 for regulating the temperature of the mash in the tank 1. The volume of liquid cooled by the cooler mixes in the upper part 14 of the tank with the automatically circulating portion and is then fed with the same into the aerator 4. For destroying any foam being eventually present in the upper part 14 of the tank, the pipe 10' terminates into a sprinkler 12.

The automatically circulating portion discharges from tank 1 through pipe 18 attached adjacent the lowermost part of the tank and is fed again into the upper part of the tank through pipe 18' (not shown in FIG. 1) and inlet 17. For the purpose of continuous growing without renewal of fermenting yeast may be added auxines or other growth hormones to the nutritive solution which is continuously fed through inlet 17 as the automatically circulating portion (not shown in FIG. 1).

The automatic circulation of the mash is effected thereby that the rising speed of the air bubbles in tank 1 is equal to or somewhat smaller than the quantity (in liters) of air-free mash fed into the aerator 4 divided by the cross-section of tank 1. An eventually necessary regulation may be effected by varying the height of liquid level 2 by means of regulation of the height of discharge (pipe 18) and/or regulation of the volume of air fed per second.

Pipe 18 simultaneously serves for withdrawal, preferably for continuous withdrawal of yeast through pipe 18'. Pipe 18 is preferably arranged in such a manner that the height of discharge may be adjusted that means that the highest point of pipe 18 may be above the liquid level 2, at equal height or somewhat lower for emptying the tank 1 completely.

In the upper part 14 of tank 1 is therefore air-free mash fed through pipes 18', 18' and skimmed by means of sprinkler 12. This mash is then fed into the aerator 4. From the aerator 4 is fed mash with extraordinary fine air bubbles through pipe 11 into the bulk of the liquid in the tank 1.

Upon entry of air into tank 1, the height of the liquid level is increased for the size of the corresponding air volume so that the lower part of the tank closed by means of a plate 15 or the like is filled with a fine mixture of liquid and air as indicated by broken lines. The closure plate 15 terminates in a screening plate 15a through the openings of which the air bubbles rising from the lower part of the tank may escape into the upper part 14. Opposite the screening plate 15a is suitably provided a baffle plate 15b for assisting the removal of air. An outlet 16 is provided for the discharge of air from the upper part 14 of the tank.

By the apparatus according to the invention is therefore obtained a super-aeration of the mash. The particular advantage of the process consists therein that by the super-aeration may also be supplied the air necessary for the aeration of mashes with high yeast concentration. This fact is of utmost technical importance since by working with a mash with high yeast concentration the floor space required by a yeast growing plant is diminished in an extraordinary extent. The super-aeration renders possible working with yeast concentrations of 15–50%, preferably of 50%. It may be stated for example that the floor space required for a technical plant is diminished elevenfold relative to the manufactured product if instead of a mash with 5% yeast concentration is used a mash with 40% yeast concentration. Tests have further shown that the yield is increased for 10% or more by super-aeration of the process according to the invention and by working with high yeast concentrations. This effect is however not obtained with low yeast concentrations (of 10% for example). As the reason for this is assumed that with the higher yeast concentration the distribution of air is improved in the yeast containing mash. In the higher concentrations, the rising air bubbles are deformed and their surface is considerably increased. In this manner is obtained a greater surface for the diffusion of oxygen from the air bubbles into the mash and thereby the diffusion of an increased volume of oxygen.

The process according to the invention shows the further advantage that the constantly increasing quantity of yeast may at the same time be continuously withdrawn so that the whole apparatus may be kept relatively small. It is needed a tank of moderate size only.

A particular advantage of the apparatus according to the invention consists therein that the aerators and also the eventually provided coolers are arranged outside the mash tank so that they may be removed and cleaned easily and without difficulties or may be exchanged in case of need.

Figure 2:
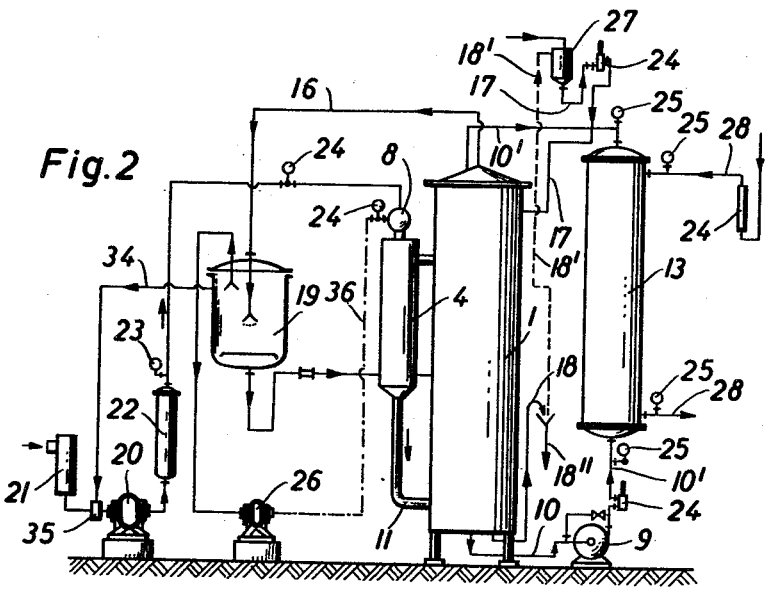
FIG. 2 shows diagrammatically a plant for continuous growing of yeast, especially with high yeast concentrations.

The process according to the invention is particularly suited for the aeration of yeast-containing mashes in the continuous growing of yeast, especially with high yeast concentrations. FIG. 2 shows diagrammatically such a plant for continuous growing of yeast with use of the process according to the invention.

The tank 1 contains the yeast-containing mash which is mixed with air during operation. For continuous withdrawal of the increase of yeast per second from the quantity of fermenting yeast is provided pipe 18 which is connected with pipe 18" leading to the separator and with pipe 18' so that a predetermined quantity of mash is automatically circulating which is supplied again as a nutritive solution to tank 1 by pipes 18' and 17. For the purpose of a permanent growth, auxines or other growth hormones may be added to this nutritive solution as indicated diagrammatically at 27. A flow meter 24 may be provided in the supply pipe 17 for the nutritive solution. The aeration of the mash is effected in the described manner by aerator 4 and pipe 11. The fresh air for aerator 4 is drawn in by the blower 20 over an air filter 21 and is fed by pipe 8 into the aerator 4. In the fresh air pipe are preferably provided a bacteria filter 22, a manometer 23 and a flow meter 24. Air-free mash is drawn in from tank 1 through pipe 10 by pump 9 and is fed through pipe 10' and cooler 13 into the upper part of tank 1. In the pipe 10' may be provided a flow meter 24 and also a thermometer 25. The cooler 13 is supplied with water by pipe 28 in which likewise may be provided a flow meter 24 for ascertaining the quantity of flow through the cooler and a thermometer 25 for indicating the difference of temperature between inflowing and outflowing cooling water. Since the mash is continuously pumped through the cooler 13 and this cooled quantity of mash is then mixed in the upper part of tank 1 with the automatically circulating portion fed by pipe 17, and since this mixture is fed for aeration into aerator 4 and is then fed by pipe 11 again into tank 1, the temperatures of the mash in tank 1 may be suitably regulated by means of the cooler 13 lying outside of tank 1. The exhaust air of tank 1 is fed by pipe 16 into a water separator 19.

Exhaust air has to be added to the fresh air from filter 21 for working with lower yeast concentrations. This exhaust air is taken from the separator 19 and is fed by pipe 34 into the mixing valve 35 for fresh air and exhaust air. By suitable adjustment of this valve is attained that the volume of mixed air supplied to tank 1 at lower yeast concentrations corresponds to the volume of fresh air supplied at high yeast concentrations. By mixing with exhaust air may also be produced alcohol which consumes a lesser volume of oxygen.

FIGS. 1 and 2 illustrate the apparatus only diagrammatically. It is known to provide in fermentation vats a plurality of series-connected aeration devices. In a similar manner is arranged in the apparatus according to the invention a plurality of aerators 4 (12 aerators for example) in series outside of tank 1. Below one aerator is arranged a pipe 18 for discharge of the automatically circulating portion and opposite the next aerator is arranged the corresponding pipe 17 connected with pipe 18 for feeding the circulating portion as a nutritive solution into the aerator. In this manner, the tank 1 (fermentation vat) is divided into several sections, each section being supplied separately with fresh air and the mash circulation of the single sections being connected in series to a common circulation. By such a process, the different assimilation periods of the nutrients present in the nutritive solutions may be taken into account. The increase of yeast is continuously withdrawn through the last pipe 18, 18" in such a manner that with a constant filling of the tank the discharge of mash is regulated so that it is equal to the continuously supplied quantity of nutritive solution while the nutrient contents of the solution corresponds to the final contents of yeast defined by the circulation period and to the obtainable yield. The nutritive solution is supplied separately to the single sections of the tank, namely either the same quantity of nutritive solution with equal contents of nutrient to each section or nutritive solutions with contents varying from section to section, preferably with decreasing contents of phosphate and nitrogen. A part of the exhaust air from tank 1 and separator 19 which has only a low content of oxygen, may be fed by means of the blower 26 through pipe 36 (indicated by a dot-dash line) into the aerators which are arranged at the end of tank 1, as f.i. the two last aerators where the yeast-containing mash contains ripened yeast.

In the continuous growing of yeast in an apparatus of the kind illustrated in FIG. 2 with aerators 4 arranged in series may be worked—as has already been mentioned—with yeast concentrations between 15 and 50%, preferably with 50% related to air-free mash, due to the super-aeration obtained with the process according to the invention. By appropriate regulation of the circulation, the added molasses is diluted by the air-free mash preferably up to 500- to 1350-fold quantity and by appropriate aeration of the yeast-containing mash is maintained a constant content of air, preferably up to 100% of the quantity of the mash.

Figure 3:
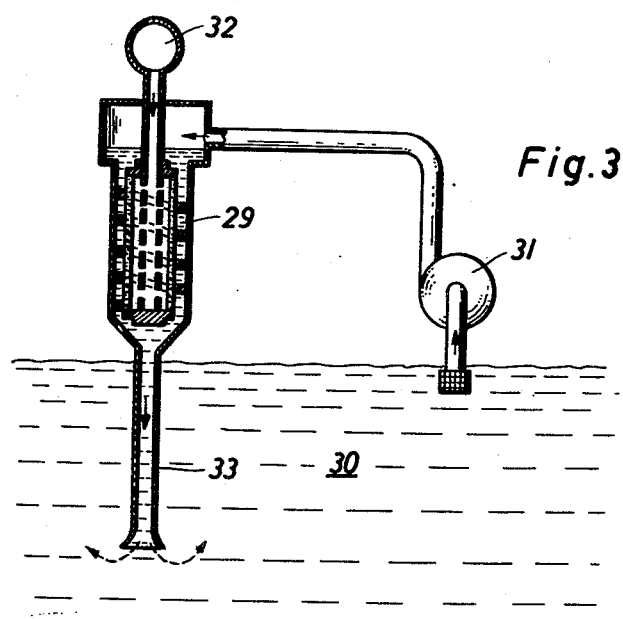
FIG. 3 shows an apparatus for carrying out the process according to the invention for the supply of waters with oxygen.

The process according to the invention for gassing and aeration of liquids is also suited for the manufacture of penicillin and of other products for which an intimate mixture of liquids and gas is necessary. The process according to the invention may also be used for the supply of contaminated waters, especially of flowing waters with oxygen. FIG. 3 shows an embodiment of an apparatus for carrying out the process according to the invention for this purpose. In this case, the apparatus for the supply of oxygen or for the aeration of the water, respectively, is placed in a boat which is driven upstream in flowing waters. The aerator 29 is arranged at the end of the boat. The water for breaking away fine air-bubbles is supplied from waters 30 by the pump 31. The supply of oxygen or air into the diaphragm is effected at 32 from a bottle placed into the boat or by a compressor. The fine gas bubbles discharging from the aerator together with the water fed into the same are introduced into the waters by means of a pipe 33. The gas bubbles are then taken along by the flowing waters and due to their low rising speed are distributed in the water dependent on its flowing speed. If for example the water-air mixture enters into the flowing waters in a depth of 2 m. and if the air bubbles have a rising speed of 3 cm./s., the rising period lasts about 70 s. In flowing waters, it will be somewhat less. A further possibility of regulation is in this case also a regulation of the driving speed of the boat carrying the apparatus according to the invention. Such a supply of waters with oxygen and air will considerably contribute to the purification of contaminated waters. The expended energy is extraordinary low and the apparatus is very simple.

It is not absolutely necessary to provide a helix for the flowing path of the liquid to increase the speed of the liquid which breaks away the air bubbles from the wall of the diaphragm. It will be sufficient in many cases to provide for this purpose a reduction of the cross-section between the diaphragm and the outer wall of the aerator.

Especially in the above-described embodiment for carrying out the process according to the invention for the supply of waters with oxygen, this simple constructive solution will have to be preferred.

Summarizing may be stated as advantages of the process and of the apparatus according to the invention that compared with a perodic non-continuous process for the fermentation of yeast the required volume of the tank and thereby also the required room space is considerably diminished. The required volume of the tank is for example only one tenth of the volume required for a non-continuous process. Further is possible working with higher yeast concentrations, namely up to 50% and more. There are obtained higher yields. From the reduction of the volume of the tank results at the same time a reduction of the required volume of oxygen and of expended energy.

The mechanical accessories may also be smaller. The process may be controlled nearly automatically. Service and maintenance are easier than in the non-continuous process. The arrangement of the aerators and eventually also of the coolers outside of the tank has the advantage that these parts may be removed and cleaned easily and without difficulty or may be exchanged in case of need. Clogging of the aerators may be prevented in an easy manner.

What I claim is:

1. A method of producing yeast by aerating a yeast containing mash contained in a tank comprising the continuous extraction of fermentation products from the tank and aerating the continuously extracted fermentation products by passing the same around an oxygen containing gas charged diaphragm and returning the aerated fermentation products to the tank below the level of the fermentation products therein, continuously extracting other of the fermentation products from the tank, removing a portion of the other fermentation products and recirculating the remainder thereof into the upper portion of the tank after adding thereto a nutritive solution in quantity equal to the removed fermentation products.

2. The method of claim 1 wherein the first mentioned continuous extraction of fermentation products is from the upper portion of the tank above a baffle in the tank and the aerated fermentation products being returned to the tank below the normal level of the fermentation products therein with the aeration taking place within a separate container.

3. The method of claim 1 wherein additional fermentation products are withdrawn from the bottom of the tank, cooled, returned to the top of the tank and sprayed therein.

4. The method of claim 1 wherein the first mentioned continuous extraction of fermentation products is from the upper portion of the tank above a baffle in the tank and the aerated fermentation products being returned to the tank below the normal level of the fermentation products therein with the aeration taking place within a separate container, withdrawing additional fermentation products from the bottom of the tank, cooling and returning the same to the top of the tank by spraying thereinto above the baffle.

5. The method of claim 1 wherein the fermentation products passed around the diaphragm are moved in a spiral pattern to assure the proper aeration thereof.

6. The method of claim 1 wherein the yeast concentration is on the order of 50% based on air-free mash.

7. The method of claim 1 wherein the circulating speed of the fermentation products is regulated to maintain a quantity of air in the fermentation products on the order of 100% of the mash.

References Cited in the file of this patent

UNITED STATES PATENTS

| | | |
|---|---|---|
| 1,703,272 | Heijkenskjold | Feb. 26, 1929 |
| 2,281,457 | Rosenqvist | Apr. 28, 1942 |
| 2,322,320 | Schultz et al. | June 22, 1943 |
| 2,333,956 | Schultz et al. | Nov. 9, 1943 |
| 2,448,927 | Fischer | Sept. 7, 1948 |
| 2,750,328 | Stimpson et al. | June 12, 1956 |